US010101195B2

(12) United States Patent
Harada et al.

(10) Patent No.: US 10,101,195 B2
(45) Date of Patent: Oct. 16, 2018

(54) STERILIZABLE ANIMAL SCALE

(71) Applicant: Vium, Inc., San Mateo, CA (US)

(72) Inventors: Kevin Harada, San Francisco, CA (US); Jonathan Betts-Lacroix, Belmont, CA (US)

(*) Notice: Subject to any disclaimer, the term of this patent is extended or adjusted under 35 U.S.C. 154(b) by 117 days.

(21) Appl. No.: 15/395,976

(22) Filed: Dec. 30, 2016

(65) Prior Publication Data

US 2017/0108368 A1    Apr. 20, 2017

Related U.S. Application Data

(63) Continuation-in-part of application No. 14/631,230, filed on Feb. 25, 2015, now Pat. No. 9,671,276.

(51) Int. Cl.
*G01G 21/30*    (2006.01)
*G01G 17/08*    (2006.01)

(52) U.S. Cl.
CPC ............. *G01G 21/30* (2013.01); *G01G 17/08* (2013.01)

(58) Field of Classification Search
CPC .... G01G 19/52; G01G 21/22; G01G 23/3728; A01K 1/015; A01K 1/031
See application file for complete search history.

(56) References Cited

U.S. PATENT DOCUMENTS

| | | | | |
|---|---|---|---|---|
| 4,884,645 A | * | 12/1989 | Knothe | G01G 21/28 177/180 |
| 5,895,894 A | * | 4/1999 | Zumbach | G01G 21/30 177/124 |
| 8,796,565 B2 | * | 8/2014 | Lauer | G01G 21/28 177/243 |
| 8,797,166 B2 | * | 8/2014 | Triener | G01G 17/08 340/573.1 |
| 9,671,276 B1 | * | 6/2017 | Betts-Lacroix | G01G 21/28 |
| 2012/0085291 A1 | * | 4/2012 | Conger | A01K 1/0047 119/419 |

(Continued)

FOREIGN PATENT DOCUMENTS

| | | | | |
|---|---|---|---|---|
| JP | H08-178736 | * | 7/1996 | G01G 21/28 |
| JP | 2005283328 | * | 10/2005 | G01G 1/24 |

OTHER PUBLICATIONS

English translation of JP H08-178736.*
English translation of JP 2005283328.*

*Primary Examiner* — Natalie Huls
(74) *Attorney, Agent, or Firm* — Kim Rubin

(57) ABSTRACT

A sterile scale is described suitable for automated use in animal cages. A case is covered by a flexible membrane that provides both sealing against pathogens and mechanical compliance for transfer of weight on an above weighing platform through a single sealed penetration in the membrane to a load cell in the case. The membrane comprises a perimeter that is attached and sealed to the case with a membrane frame, a penetration area, penetrated by a rigid weight-bearing element, and an isolating compliance area. A skirt on the weighing platform surrounds the case, protecting detritus from entering from below onto the membrane, while providing open-air movement. The weighing platform and case are easily separated permitting fluid-based sterilization of both. The weight-bearing element may contain an electrical connection from the case to the platform, through the membrane.

15 Claims, 1 Drawing Sheet

(56) References Cited

U.S. PATENT DOCUMENTS

| | | | |
|---|---|---|---|
| 2014/0251228 A1* | 9/2014 | Jensen-Jarolim | A01K 29/005 |
| | | | 119/421 |
| 2016/0069737 A1* | 3/2016 | Canwell | G01G 21/28 |
| | | | 177/238 |
| 2016/0231167 A1* | 8/2016 | Masin | G06K 7/10386 |
| 2017/0105385 A1* | 4/2017 | Betts-Lacroix | A01K 1/031 |
| 2017/0108368 A1* | 4/2017 | Harada | G01G 19/00 |
| 2017/0108369 A1* | 4/2017 | Harada | G01G 17/08 |
| 2018/0103617 A1* | 4/2018 | Izumo | A01K 29/00 |

* cited by examiner

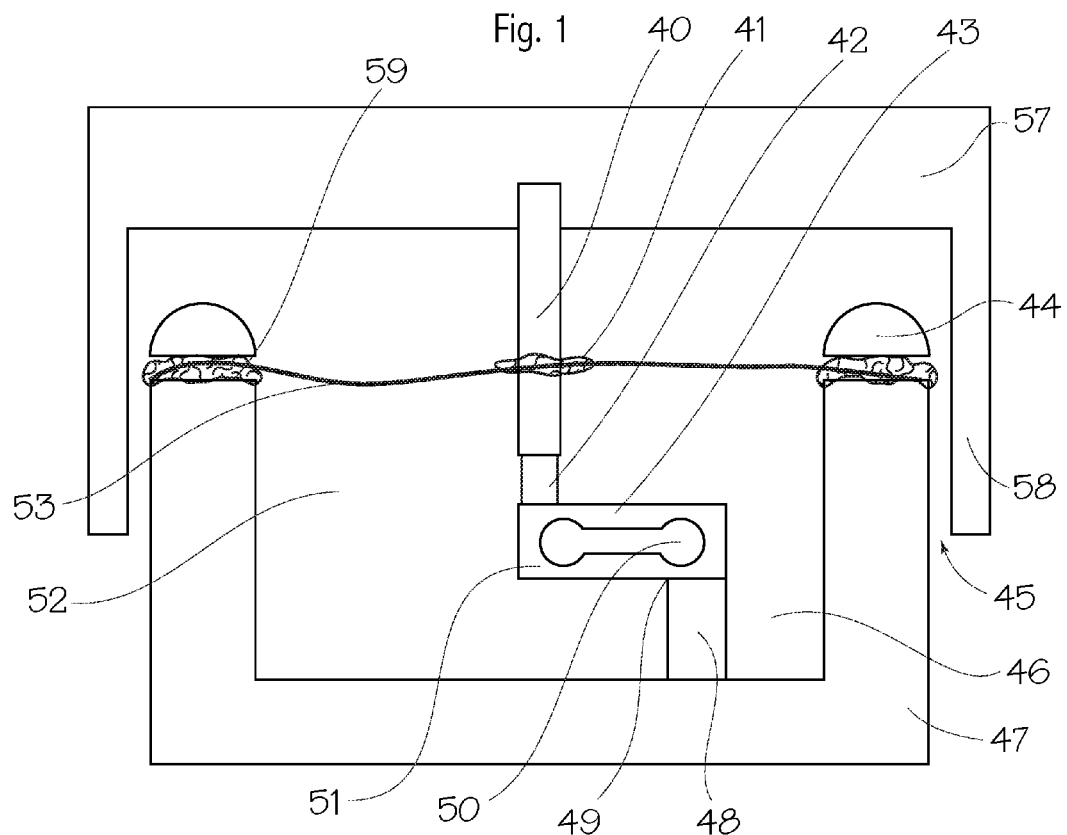
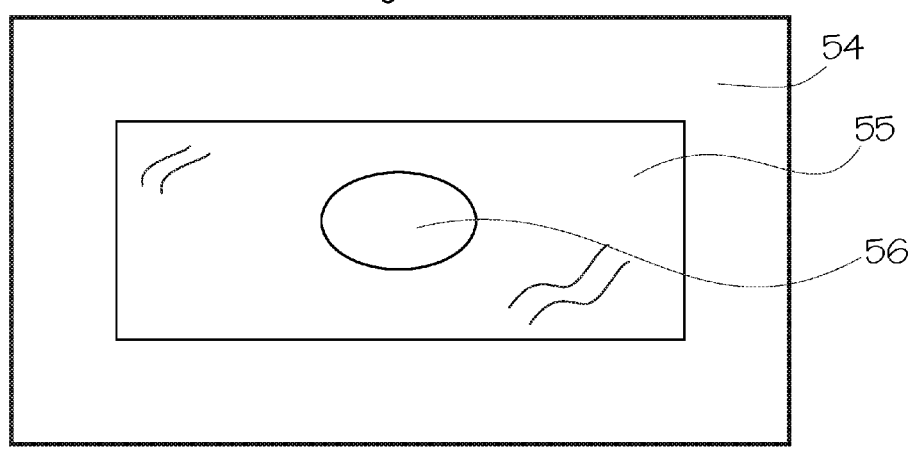

STERILIZABLE ANIMAL SCALE

The invention relates to a scale such at might be used for animals in a vivarium cage.

BACKGROUND OF THE INVENTION

Vivariums house a number of animals, typically test animals, such as mice, in a number of cages, often a large number. The test animals are frequently used test drugs, genetics, animal strains, husbandry practices, methods of treatment, procedures, diagnostics, and the like. We refer to all such uses of a vivarium as a study.

Regular weighing of animals is an important part of studies. In the prior art, weighing is done by hand and labor intensive. The handling of the animals often changes their behavior or their health, altering the results or quality of the study. Also, handling the animals comprises the sterility of the cages and animals, putting the health of the animals and workers at risk.

Such manual weight recording is inherently infrequent due to the high labor time and cost. This infrequency creates three weakness of the prior art. First, problems may not be discovered until after an unacceptable delay, such as a failure to eat. Second, subtle behavior or health attributes, such as an animal's eating schedule, will be missed. Third, manual handling requires light for the worker. For many animals, this light interferes with and alters their behavior and health, and thus alters the results of the study compared with animals in their natural lighting regimen.

Vivarium cages are normally pathogen-free. Animals and thus their cages must be isolated from outside pathogens or contamination and from pathogens or contamination from other animals or other cages. This presents a significant challenge to vivarium automation and in particular to in-cage animal weighing and automatic animal identification. Electronic equipment placed inside a cage may need to be discarded after a single study due to the inability to sterilize the equipment between studies. Such equipment may be an animal ID sensor, a scale, or a wireless transmitter. In addition, in order to keep the cages pathogen-free it is desirable to have as few cage penetrations as possible. This means that power or data wiring to electronic equipment inside the cage is undesirable. Although this requirement motivates wireless devices, these devices must then be battery powered, which adds to cost, size and weight, and may introduce pathogens. Batteries may have to be changed out during a study, which adds to both equipment and labor costs and may introduce pathogens.

Sterility or pathogen free is important in vivariums to assure the health of the animals and the health of the workers. Also, sterility is critical for accurate, consistent, credible and repeatable study results. Sterility refers to the sufficient restriction of pathogen type and quantity so as to not so affect the outcome of the study, or the health or the behavior of animals or people. Sterility also refers to husbandry attributes, supplies and usage, as well as health.

An automated scale to meet vivarium requirements must have the following features: electronics in a fully sterile enclosure; animal chew-proof exterior; all components sterilizable by immersion in a sterilizing fluid; internal, rechargeable batteries; wireless connectivity, ideally redundant, ideally narrow range, ideally bi-directional; tool-less assembly and disassembly for sterilization and charging; free of clogging from bedding; reusable in different cages; free of dangerous or poisonous elements to animals; and a cage-mounting configuration to avoid movement by cage animals. Prior art with these features has not been identified.

SUMMARY OF THE INVENTION

One embodiment comprises a case sealed by a flexible membrane. The membrane is attached to a membrane frame to maintain the uniform and proper planarity of the membrane. The frame with the membrane is attached to a perimeter of the case. The membrane is penetrated by a vertically rigid penetrating element that also houses electronic connectors, and thus serves two independent functions in a single element. The membrane comprises three area regions: a perimeter area held fixed to the membrane frame; a central area that is penetrated by the rigid penetrating element; and a compliance area that isolates the perimeter area from the central area. The membrane frame with the membrane is sealed at the case attachment. The penetration is sealed at the penetration. Seals provide sterility, meaning a barrier against pathogens that could harm the animal, cage, cage air, or study results. The scale also comprises a lid, or weighing platform, that comprises a skirt that surrounds the upper outside of the case. The lid mates both mechanically and electrically through the penetration element into the sterile case. The case comprises a load cell or other weight-measuring element; electronics, chargeable power source such as lithium batteries, processor and communication electronics. The scale also comprises wireless communication, such as radio or optical, which may be bi-directional and may be redundant. The antenna or optical element may be located in the lid, in which case electrical connectivity between the electronics in the case and the electronics or electronic components in the lid is via the electrical connections inside the penetrating element. A communications element may have a narrow beam to avoid interference with other cages and may be elevated to avoid contamination and may be covered so as to be chew resistant. The lid and skirt are made from non-poisonous material and are shaped, such as with edge and corner radii, to be chew resistant. The skirt may be dimensioned, configured, and shaped to avoid contamination between the lid and the case, such as by bedding. Weight passes from an animal on the lid, through the lid, through the penetrating element, through the weighing sensor, into the case. Electrical signals pass from the electronics internal in the sterile case, through the electrical connections in the penetrating element, into the lid, then to the communication elements such as an antenna or optical transmitter/transceiver. The power source in the case may be charged via the electrical connection, in the penetrating element. The lid may be removed via a simple mating element to the penetrating element. Mechanical removal of the lid accomplishes electrical disconnection concurrently. The lid and the case are then separately sterilizable by immersion in a sterilizing fluid. Re-attaching the lid accomplishes mechanical connection and electrical connection concurrently. The case comprises peripheral projections or detents to secure it in a fixed cage location. The projections or detents may be configured to mate with a cage so the scale may be placed and removed by hand and held in place by gravity so that no tools or hand-operated fasteners are required.

BRIEF DESCRIPTION OF THE DRAWINGS

FIG. 1 shows a side view of an exemplary case, lid, skirt and penetrating element.

FIG. 2 shows a top view of areas in an exemplary compliant membrane.

DETAILED DESCRIPTION OF THE INVENTION

Turning now to FIG. 1, we see a cut-away side view an embodiment. A cut-away view of the case 47 is shown. The case may be rectangular, oval, or another shape. The shape may fit conveniently in a corner or end of an animal cage. The material may be metal, such as stainless steel or galvanized steel or aluminum, or a plastic such as ABS or another plastic that is non-toxic if chewed and does not out-gas. The case may be injection molded, 3D printed, monolithic or assembled from components.

A cut-away side view of a lid 57 with a skirt 58 is shown. The lid operates as a weighing platform for one or more animals. The lid skirt 58 overlaps the upper sides of the case creating a vertical opening 45 that is narrow enough and high enough to minimize penetration, in the opening, of cage detritus such as bedding, yet wide enough to achieve mechanical clearance between the lid and case and also to not collect moisture. The lid clears the membrane and membrane frame sufficient for the lid to move or pass pressure through the penetrating element, and tolerate manufacturing and operational tolerances, age, and distortion, and to avoid accumulation of moisture. Note that pathogens, vapor and aerosols may pass from the cage interior through the vertical opening 45 and between the lid and the upper surface of the membrane.

A cut-away side view of a membrane frame 44 is shown. Typically, the membrane frame 44 shape and dimensions are functionally matched to the perimeter top of the case 47. Typically, the membrane 53 is first attached to the frame 44, and then the frame is attached to the case. In one embodiment, the membrane 53 provides three functions: (i) sterile seal between the outside of the case and the inside; (ii) high compliance to not adversely affect a measured weight on top of the lid; (iii) sterile seal via a gasket function between the membrane frame and the case. A rubber or latex sheet may be used for the membrane 53. Sterile seals 59 may also or alternatively be provided via grease, calk, glue, adhesive, other gasket material, a pressure fit, and the like. Securing of the membrane frame 44 to the case 47 may be via calk, glue, grease, adhesive, screws or other fasteners, clips, press-fit, clamps, magnets, and the like 59, in any combination. One purpose of the membrane frame is to hold the shape of the membrane uniform, such as substantially planer, symmetric, or both, with optional consistent sag 53 in the compliance area (FIG. 2, 55), such that compliance of the membrane during weighing is minimal, linear or consistent (in any combination) so as to not adversely affect the weighing function of the scale. Scale calibration may then inherently take into account any action of the membrane on motion or pressure of the lid relative to the case.

A side view of a rigid penetrating element 40 is shown. The purpose of this element is to transfer weight or pressure from the lid 57, through the membrane 53, to the weighing sensor 43. Any number of intermediate or mechanically connecting elements may be in this weight-path such as 42, shown schematically. The rigidity required is sufficient for the function of the scale. Note in particular that the rigidity may be only in the vertical axis. For example, a point, a sliding connection, or horizontally compliance may be used, permitting one or more horizontal motions or rotational motions of the lid relative to the weighing element. The penetrating element may be metal or plastic, either similar to or dissimilar to the material of the case. However, the penetrating element does not need to be chew resistant, except for any portion that penetrates the lid and is not otherwise protected. In addition, the penetrating element may be solely or partially electrical connector(s) or their shell(s), although such weight-bearing or penetration functions are not typically a primary function of electrical connectors in the art. The penetrating element may be solely or partially circuit board(s). The penetrating element may be solely or partially a screw, bolt or rod, hollow or solid. Sealing of the penetrating element where it meets the membrane may be accomplished similarly to or dissimilarly to the sealing as described above for the membrane frame to the case. Such sealing is shown 41. Reinforcement may be provided within or around the penetration area (FIG. 2, 56).

The weight sensor 43 may be a load cell or other weight or pressure sensing device or assembly. A typical hollow region in a load cell is shown 50. Output may be electrical, electronic, digital or analog, or optical. If a load cell, the free end 51 is typically connected directly or indirectly 41 to the penetrating element 40; while the fixed end 49 is connected directly or indirectly 48 to the case 47. Note that such indirect connections may include the use of a circuit board (s), not shown.

Electronics and a power source are not shown in the Figure. These are well known in the art. Communication elements are not shown in the Figure. These are well known in the art. The communication elements may be the case or in the lid. 46 and 52 show the sterile interior of the case, bounded at least partially on top by the membrane 53 and sealed at least in part by seals 59 and 41.

Turning now to FIG. 2, we see an exemplary, overhead view of a planer compliant membrane. This view may be either scale realistic or schematic only. A perimeter area 54 is shown where a membrane frame connects to the membrane. A penetration area or zone 56 is shown, through which the penetration element passes. Although the borders between these areas are shown by a hard line in the Figure, such borders may not be so well defined. The penetration area may be created by the penetrating element and optionally its seal or reinforcement. The compliance area 55 should isolate the perimeter area from the penetration area to permit the lid to have free motion, restricted only by the compliance zone of the membrane, with respect to the frame, as described elsewhere herein.

Embodiments include more than one penetration element and optionally more than one penetration area of the membrane. For example, two or three penetration elements may be used to minimize tilt of the lid. In some embodiments, connections between two, three or more penetration elements to the lid are rigid only or predominantly in the vertical axis, in order to permit bend, manufacturing or operational tolerances or motion in other axes and planes.

Elements connected to or part of the case to accomplish positional alignment within a cage include protruding pins, recesses or detents, concave corners, or protruding curved, hooked, or triangular projections. Such projections, recesses or detents may mate with corresponding features in a cage or other scale receptacle such that the scale may be placed and removed by simple vertical motion by hand. Curved, hooked, or triangular projections may be used to place a scale in a receptacle by first aligning the projection(s), and then rotating the scale into a horizontal position so the projection(s) engage. Such elements are not shown in FIG. 1.

A nexus of novelty is the use of the compliant membrane to accomplish both pathogenic sterility and compliance for weight bearing penetration. Another nexus is the use of a single penetration. Another nexus is the use of a combined mechanical weight-bearing penetration and electrical penetration element. Another nexus is the configuration of the skirt or membrane frame to minimize detritus from moving upward through the skirt-case gap onto the membrane, while permitting free, unimpeded motion, constrained only by the compliance zone of the membrane, for weighing. Another nexus is the easy removal of the lid from the case to permit separate sterilization by immersion in a sterilizing fluid of both the lid and case. Another nexus is the use of a connector integrated with the penetrating element that provides two additional functions: electrical connectivity between the case and lit of wireless communication and an electrical charging port for a power source in the case. Another nexus is the use of one or more electrical connectors as the rigid element as described herein. Another nexus is the use of a flexible membrane with three separate purpose areas as defined herein.

Suitable horizontal dimensions for the scale may be in the range of 2 to 24 inches, or the range of 4 to 10 inches. Ideally, the scale is sized so that one animal to be weighed may easily position itself fully on the scale. Suitable corner radii of the scale case and lid should be large enough to prevent or minimize chewing, or be made out of a chew-resistant material, or both. A suitable gap between the lid and the case is in the range of 1/64 to 1/2 inch, or in the range of 1/8 to 1/4 inch. The gap should be sized relative to the detritus or bedding in the cage. A suitable height for the overlap of the skirt over the case is in the range of 1/16 to 4 inches, or in the range of 1/8 to 2 inches. A suitable thickness of the membrane is in the range of 0.1 to 1.5 mm, or in the range of 0.2 to 0.8 mm. A suitable material for the membrane is neoprene, rubber or latex. Thickness should ideally depend on the desired weight range of the scale.

A scale of an embodiment is suitable for use in, or used in, a sterile animal cage that is free of electrical penetrations.

A scale of an embodiment may be used for any purpose other than weighing animals, particularly in environment where sterility is important, including for people, infants, organs, use for biological or chemical research, hazardous material, explosion-proof environments, corrosive environments, radioactive environments, or for other medical or research use.

Although "sterile" and "sterilizing" are used in the disclosure of this invention, these words may also mean "clean" and "cleaning," particularly with respect to undesirable material or contamination, such as dust, liquids, chemicals and the like.

One embodiment uses IR (infrared) transmitters, which may also be transceivers. The IR communications may be through an IR transparent top of an animal cage housing the scale. The IR optical path may be restricted with tubes or lenses to restrict the amount of stray IR light, which might comprise IR-sensitive cameras. The IR spectrum may be restricted to an IR range for which cameras are not sensitive. The IR communication may be modulated such that lower power is needed, so that this IR light is dim enough to not interfere with cameras.

One embodiment only transmits weight values when it receives wirelessly a command to do so.

One embodiment only transmits weight values when the weight on the scale changes more than a predetermined amount: absolute or relative change; increased or decreased weight. A series of weights may pass through a smoothing or averaging function prior to transmission. Such a function may minimize sudden apparent changes in weight to movement of the animal being weighed. This function may be used in the data path for weight value transmissions, or may be used in the data path to detect a change of weight that triggers a new transmission, or both.

One embodiment transmits a first series of weight values during a first time interval, at a first time spacing between values; then, transmits a second series of weight values during a second time interval, at a second time spacing between values. For example, weighs may be transmitted at eight samples/sec for two seconds as a first series, at one sample per second for ten seconds for a second series.

One embodiment uses the transmitted scale weight in conjunction with an animal ID sensor. Such an animal ID sensor may be RF ID, capacitive using the top module, ECG electrical contacts on the top of the upper modules, or one or more camera images. If RFID is used, an RFID chip may be on the animals' ear; the RFID receiver may be in the scale or outside the animal cage. Numerous other forms of animal ID are known in the art. In one embodiment One embodiment comprises one or more IR transceivers in the upper module, facing upward. IR transmissions to and from these transceivers may be through a transparent cage top. Many other forms and configurations of wireless communication are known in the art.

One embodiment of a system of measurement and a method of measurement uses the sterile, wireless scale in an animal cage that uses an animal ID to associate and record weights on the scale with specific animals in a cage with more than animal.

One embodiment uses potting compound around of over electronic components in place of a flexible, sealed membrane and its associated seals. In this embodiment the load cell or other weight sensor is made out of a non-corrosive material such as stainless steel or plastic, or is coated or anodized to protect attains corrosion, such as anodized aluminum. In these embodiments, the penetrating elements are in the same relative configuration as other elements, but need not penetrate a membrane.

One embodiment comprises one or more optical communication elements on the top of the lid that are elevated above the top of the lid so as to avoid optically interfering contamination, such as bedding.

One embodiment comprises one or more communication elements comprising a narrow beam angle so as to avoid interference with other cage or cage-associated communication elements.

One embodiment comprises a communication protocol free of device-ID specific association or device pairing. One embodiment comprises a communication protocol free of device-ID.

One embodiment comprises a case with at least one corner partially cut off or comprises a concave recess, or both, so as to mate with a curved inside corner of a cage.

Certain best modes or implementation notes, or elements of embodiments, are listed below:

(a) The spring pressure from the membrane should be minor and may be ignored or corrected for during calibration. With no weight on the weighing platform, the membrane may sag and thus generate an artificial weight. With some weight on the weighing platform, the membrane may be stretched and thus generate an upward force appearing as a negative weight.

(b) Scales should be calibrated at two points: a zero (tare weight) and at a nominal weight, such as an average weight of an expected load (e.g., a mouse or rat), or 10%, 25% or 50% of full scale. Such calibration assumes sufficient linearity and effectively generates an offset and slope of the weight v. voltage curve.

(c) Any twist or non-uniformity of the membrane may produce strange, inconsistent or non-linear forces. Thus, design, manufacturing and embodiments should strive to minimize any distortion, twisting, asymmetry, or non-uniformity of the membrane.

(d) The membrane may also be called a gasket, depending on context and what function or attribute of the membrane is being discussed.

A mouse typically weights about 25 grams. A rat weighs typically 200 to 500 grams. A scale with full-scale range of 1000 grams may be suitable for both mice and rats.

(e) Embodiments include limit stops for the upper module, which may be fixed height relative to the case or may be adjustable, such as screws or set screws.

(f) Lithium batteries may run 1 to 4 weeks between charging. Embodiments include charring through the same connector on the lower module that is used to connect to the upper module. Also embodiments include entering calibration data through this same connector. Embodiments include calibration (setting and storing calibration coefficient) via the communication port. Embodiments include no calibration parameters or coefficients stored in the scale but rather these are kept external, so that correcting raw scale data is done externally after the scale transmits scale weight as raw data. Embodiments include limit testing prior to transmission; storing, averaging and queuing of weight data.

(g) Steps in order used to recycle scales between cages and studies: separate upper and lower modules; clean both; charge lower module; sterilize both; then reassemble.

All embodiment and combinations may be used in a vivarium.

Embodiments are specifically claimed for a vivarium that uses a scale as described in the specification, claims or drawings. Embodiments are specifically claimed for a method of operating vivarium that uses a scale as described in the specification, claims or drawings.

DEFINITIONS

Value of a weight—a digital or analog weight, number, value, n-tuple, or a metric that can be used to compute a weight, or a metric derived from a weight. As one example, a simple digital reading from an analog-to-digital (A/D) converter that reads a voltage from a strain gauge or load cell may be a "value of a weight." As the k-factor of the strain gauge is known, as are other fixed constants and linear factors, the weight on the scale is easily computed from this value. In some contexts, a "weight" refers to this value of a weight.

Fixed—when two or more elements are fixed or affixed to each other, there may be or may not be intervening elements, such as spacers, rods, arms, washers and the like. So long as the two elements and the embodiment operate as if they are fixed, and they are effectively so mechanically coupled, the fixing is equivalent.

Electrically connected—when two or more elements are electrically or electronically connected to each other, or adapted to be so connected, there may be or may not be intervening electrical or electronic elements, including but not limited to processors, filters, communication links and the like. So long as the two elements and the embodiment operate as if they are electrically or electronically connected, and they are effectively so connected, the connecting is equivalent. Note the intervening elements may change the form, timing, filtering or aggregation of the signals or data; however, so long as data exiting the connection is responsive to the data entering the connection the connection is equivalent for the purposes of an embodiment or claim.

Communications element—one or more electronic components that send, receive or both, digital or analog data. Methods used include but are not limited to IR light, UV light, visible light, audio, sub-audio, ultrasonic, wireless, near-field or far-field radio, haptic, or other electromagnet communications.

Mechanically coupled or operatively mechanically coupled—transfer weight, motion or pressure from one element to another via the mechanical coupling or operative mechanical coupling. This describes a specific structural element or operation of a specific structural element, not a "functional element" in a claim. As one example, transfer points refers to a structural element, not a functional element. Such structural v. functional applies to claim construction. "Operative" means such that the scale functions as intended. One embodiment mechanically couples from a weighing surface to the free ends of one or more load cells to effectively transfer the weight on the weighing surface to the freed ends of the one or more load cells.

Free of rigid attachment—means the upper module is able to move or transmit weight as motion or as pressure to the lower module. It may sit on or pass through a flexible membrane, or another flexible support, such as rubber pads, hinges, scissors support, or other compliant coupling.

Pathogen-free—means the population of microbes, including but not limited to bacteria, viruses, prions and toxins, relevant to the experiment, are sufficiently reduced to meet the needs of the study, or to not impact the health, performance or behavior of the target animal population or of the workers.

Fluid—such as a sterilizing fluid, may be a liquid, a gas, or an aerosol.

Sterile—pathogen-free. Note that "sterile" may refer to one volumetric area compared to another and may refer only to problematic pathogens, depending on a study, study animals, and safety considerations.

Sealed enclosure—an enclosure sealed against pathogens that impact or alter study results, or alter the credibility or repeatability of study results, entering or leaving the enclosure.

Transmit difference threshold—may be a percentage of weight, or an absolute weight, or a formula incorporating both the percentage and absolute values.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

All examples are sample embodiments. In particular, the phrase "invention" should be interpreted to mean, "an embodiment of this invention." Examples, scenarios, and drawings are non-limiting. The only limitations of this invention are in the claims.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

All numerical ranges in the specification are non-limiting examples only; numerical ranges in claims are individual specific embodiments, only.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings. Embodiments of the methods of invention explicitly include all combinations of dependent method claim steps, in any functional order. Embodiments of the methods of invention explicitly include, when referencing any device claim, a substation thereof to any and all other device claims, including all combinations of elements in device claims.

We claim:

1. A sterilizable weighing scale comprising:
a case comprising an interior;
a lid;
a load cell comprising a free end and a fixed end mechanically rigid with the case, in the interior of the case;
a flexible membrane comprising a perimeter fixed zone, a central penetration zone, and a compliance zone; wherein the compliance zone isolates the fixed zone from the penetration zone;
a membrane frame, clamping a portion of the fixed zone of the flexible membrane, enclosing the compliance zone, to the case such that a sterile seal is created between an upper surface of the flexible membrane and a lower surface of the flexible membrane;
a penetrating fastener, wherein the penetrating fastener penetrates the penetration zone of the flexible membrane, wherein the penetration is sealed; and wherein a upper end of the penetrating fastener is above the flexible membrane and a lower end of the penetrating fastener, below the flexible membrane; is mechanically rigid under compression with the free end of the load cell;
wherein the upper end of the penetrating fastener is adapted to rigidly connect with the lid;
wherein a sterile volume, defined by the interior of the case and the lower surface of the flexible membrane, is created.

2. The sterilizable weighing scale of claim 1 wherein: the scale is adapted to perform a weighing function of a weight on a top of the lid when the upper end of the penetrating fastener is removably mated with the lid.

3. The sterilizable weighing scale of claim 1 wherein: an exterior of the case, an upper surface of the flexible membrane, an exposed portion of the membrane frame, and an upper portion of the penetrating fastener above the flexible membrane, together form an exterior of a primary module of the scale; and
wherein the primary module and the lid are adapted to be separately sterilized by submersing in a sterilizing fluid.

4. The sterilizable weighing scale of claim 1 wherein: the lid comprises a perimeter lip, adapted such that when the lid is removably mated with the upper end of the penetrating fastener, the perimeter lip surrounds and overlaps an upper perimeter of the case.

5. The sterilizable weighing scale of claim 1 wherein: the lid comprises a perimeter lip, adapted such that when the lid is removably mated with the upper end of the penetrating fastener, the perimeter lip surrounds and overlaps an upper perimeter of the case such that the lid forms a drip-proof covering over the membrane frame, an upper surface of the membrane, and the upper end of the penetrating fastener.

6. The sterilizable weighing scale of claim 1 wherein: the penetrating fastener comprises upper electrical contact points above the flexible membrane and lower electrical contact points below the flexible membrane, and wherein at least two of the upper electrical contact points are electrically connected to respective at least two of the lower electrical contact points.

7. The sterilizable weighing scale of claim 6 wherein: the lid comprises a lid electrical connector adapted to removably mate to the upper electrical contact points.

8. The sterilizable weighing scale of claim 7 wherein: an exterior of the case, an upper surface of the flexible membrane, an exposed portion of the membrane frame, the upper electrical contact points and an upper portion of the penetrating fastener above the flexible membrane together form an exterior of a primary module of the scale;
wherein the lid and the lid electrical connector together comprise a lid assembly; and
wherein the primary module and the lid assembly are adapted to be separately sterilized by submersing in a sterilizing fluid.

9. The sterilizable weighing scale of claim 8 wherein: the lid assembly further comprises a first and second bi-directional optical communication port and wherein the first and second ports are separated by at least an average diameter of a moving target animal.

10. The sterilizable weighing scale of claim 1 wherein: the sterilizable weighing scale is adapted to pass weight through a weight bearing path: from a target animal on top of the lid, through the lid, then through upper end of the penetrating fastener, then through the penetration zone of the flexible membrane, then through the bottom end of the penetrating fastener, then through the free end of the load cell, then through the fixed end of the load cell, then to the case, wherein the weight bearing path comprises any necessary rigid linkages to complete the weight bearing path.

11. The sterilizable weighing scale of claim 1 wherein: the scale comprises a wireless communication port comprising a protocol, transmitting weight data, that is free of device ID specific association with another communicating device.

12. The sterilizable weighing scale of claim 1 wherein: the scale comprises a wireless communication port comprising a protocol, transmitting weight data, that is free of a specific device ID in each transmitted packet.

13. The sterilizable weighing scale of claim 12 wherein: the sterilizable weighing is in a vivarium comprising at least 100 cages.

14. A method of weighing a study animal comprising the steps:
waiting for a study animal to be on the lid of the sterilizable weighing scale of claim 1;
transmitting a weight of the study animal using the sterilizable weighing scale of claim 1.

15. A method of sterilizing the weighing scale of claim 1 comprising the steps:

disassembling the lid from the upper end of the penetrating fastener;
sterilizing the lid and the case separately by submerging each in a sterilizing fluid;
reassembling the lid with the upper end of the penetrating fastener.

\* \* \* \* \*